US011117502B2

(12) United States Patent
Freienmuth et al.

(10) Patent No.: US 11,117,502 B2
(45) Date of Patent: Sep. 14, 2021

(54) VARIABLE SECTION BENCH FOR SEAT (71) Applicant: Safran Seats USA LLC, Gainesville, TX (US)

(72) Inventors: Eric O. Freienmuth, Marysville, WA (US); Eugenio Palacios, Everett, WA (US)

(73) Assignee: Safran Seats USA LLC, Gainesville, TX (US)

(*) Notice: Subject to any disclaimer, the term of this patent is extended or adjusted under 35 U.S.C. 154(b) by 0 days.

(21) Appl. No.: 16/603,027

(22) PCT Filed: Sep. 19, 2017

(86) PCT No.: PCT/US2017/052211
§ 371 (c)(1),
(2) Date: Oct. 4, 2019

(87) PCT Pub. No.: WO2018/186905
PCT Pub. Date: Oct. 11, 2018

(65) Prior Publication Data
US 2020/0189431 A1 Jun. 18, 2020

Related U.S. Application Data (60) Provisional application No. 62/482,341, filed on Apr. 6, 2017.

(51) Int. Cl.
*B64D 11/00* (2006.01)
*A47C 7/02* (2006.01)
*B60N 2/68* (2006.01)
(52) U.S. Cl.
CPC .................................. *B60N 2/686* (2013.01)

(58) Field of Classification Search
CPC . A47C 5/00; B60N 2/68; B65D 11/06; B65D 11/0619; B65D 11/0649; B65D 11/0696
(Continued)

(56) References Cited

U.S. PATENT DOCUMENTS 4,526,421 A * 7/1985 Brennan .............. B64D 11/064
297/232
4,630,864 A * 12/1986 Toll ........................ B64D 11/06
297/216.1
(Continued)

FOREIGN PATENT DOCUMENTS

EP 0105741 4/1984

OTHER PUBLICATIONS

International Patent Application No. PCT/US2017/052211, Search Report and Written Opinion, dated Nov. 28, 2017.

*Primary Examiner* — Shin H Kim
(74) *Attorney, Agent, or Firm* — Kilpatrick Townsend & Stockton LLP (57) ABSTRACT A variable section bench for a vehicle seat includes: an upper layer, a middle layer, and a lower layer. The variable section bench also includes at least one frame interface portion comprising a fore-aft section, at least one cantilevered portion comprising a fore-aft section, and a seating surface that extends along a full length of the vehicle seat in a lateral direction for a plurality of passengers. The at least one frame interface portion of the variable section bench includes increased thickness compared to the at least one cantilevered portion.

18 Claims, 10 Drawing Sheets (58) Field of Classification Search
USPC .................................................. 297/452.21
See application file for complete search history.

(56) References Cited

U.S. PATENT DOCUMENTS

| | | | | | |
|---|---|---|---|---|---|
| 4,632,452 | A | * | 12/1986 | Vogel | B61D 33/0014 297/232 |
| 5,284,379 | A | * | 2/1994 | Arnold | B64D 11/0601 297/113 |
| 5,984,415 | A | * | 11/1999 | Schumacher | B64D 11/0646 297/411.2 |
| 6,176,547 | B1 | * | 1/2001 | François | B60N 2/062 297/257 |
| 7,716,797 | B2 | * | 5/2010 | Kismarton | B64D 11/06 29/91.1 |
| 7,891,033 | B2 | * | 2/2011 | Loewenthal | A61G 5/1043 5/653 |
| 7,954,762 | B2 | * | 6/2011 | Boren | B60N 2/995 244/122 R |
| 8,205,833 | B2 | * | 6/2012 | Kismarton | B64D 11/0649 244/122 R |
| 8,393,574 | B2 | * | 3/2013 | Kismarton | B64D 11/06 244/122 R |
| 8,550,564 | B1 | * | 10/2013 | Kismarton | B64D 11/06 297/452.55 |
| 9,630,539 | B2 | * | 4/2017 | Yokoyama | B60N 2/3045 |
| 9,630,717 | B2 | * | 4/2017 | Wilkens | B64D 11/0638 |
| 9,764,844 | B2 | * | 9/2017 | Le | B64D 11/0648 |
| 10,207,808 | B2 | * | 2/2019 | Zheng | B64D 11/064 |
| 10,392,114 | B2 | * | 8/2019 | Le | B64D 11/0624 |
| 10,730,628 | B2 | * | 8/2020 | Lasell | B29C 70/682 |
| 2007/0267543 | A1 | * | 11/2007 | Boren | B60N 2/995 244/118.5 |
| 2008/0150342 | A1 | * | 6/2008 | Kismarton | B64D 11/064 297/452.18 |
| 2008/0190278 | A1 | * | 8/2008 | Martin | F41H 5/0407 89/36.07 |
| 2008/0290242 | A1 | * | 11/2008 | Kismarton | B64D 11/0649 248/503.1 |
| 2009/0084925 | A1 | | 4/2009 | Kismarton | |
| 2013/0257132 | A1 | * | 10/2013 | Chen | A47C 7/021 297/452.21 |
| 2014/0183924 | A1 | * | 7/2014 | Cvek | A47C 9/002 297/452.18 |
| 2016/0031560 | A1 | * | 2/2016 | Zheng | B64D 11/064 297/344.1 |
| 2016/0297533 | A1 | * | 10/2016 | Le | B64D 11/0648 |
| 2017/0096226 | A1 | | 4/2017 | Mansouri et al. | |
| 2020/0189431 | A1 | * | 6/2020 | Freienmuth | B64D 11/0619 |

\* cited by examiner

VARIABLE SECTION BENCH FOR SEAT

CROSS REFERENCE TO RELATED APPLICATION

This application is related to and claims priority benefit from U.S. Provisional Application No. 62/482,341 ("the '341 application"), filed on Apr. 6, 2017, entitled VARIABLE THICKNESS AND VARIABLE SECTION BENCH PANEL FOR MULTIPLE PASSENGER AIRCRAFT SEATS. The '341 application is hereby incorporated in its entirety by this reference.

FIELD OF THE INVENTION

The field of the invention relates to benches with variable thicknesses in seats for aircraft or the like.

BACKGROUND

Passenger seats, and particularly vehicle or aircraft passenger seats, are designed to ensure passenger safety for various loading conditions including, for example, hard landings and crash conditions. In some instances, regulatory and/or governmental requirements dictate that seats comply with occupant protection/impact tests. The seats must be capable of sustaining loads that cause floor deformation in the vehicle and/or significant inertial loads related to the mass of the occupant. Conventional seats (typically designed for two to four occupants) use a framework arrangement with a plurality of frames between occupants and a plurality of support members (cylindrical tubes) that extend laterally and connect to each of the plurality of frames. A seat pan is then attached to the framework (the frames and lateral support members). An example of such framework is described in U.S. application Ser. No. 15/314,123 (Pub. No. 2017/0096226).

In certain situations, it may be desirable to design seats and related subcomponents to minimize weight and maximize structural efficiency with load paths configured to transfer load from the passenger through the seat and into the structure of the aircraft. In particular, it may be desirable to design and produce a bench structure for a seat with varying sections designed specifically based on loading conditions for the seat where the seat incorporates integral lateral supports and thus eliminates the need for separate structural members in the seat framework for supporting lateral loads.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a variable section bench for a vehicle seat, the variable section bench comprises: an upper layer, a middle layer, and a lower layer; at least one frame interface portion comprising a fore-aft section; at least one cantilevered portion comprising a fore-aft section; and a seating surface that extends along a full length of the vehicle seat in a lateral direction for a plurality of passengers, wherein: the at least one frame interface portion of the variable section bench comprises increased thickness compared to the at least one cantilevered portion.

In some embodiments, the at least one frame interface portion of the variable section bench is approximately four times as thick as the at least one cantilevered portion.

The at least one frame interface portion, in certain embodiments, comprises two frame interface portions and the variable section bench comprises an internal fore-aft section located approximately halfway between the two frame interface portions.

In some embodiments, at a location of at least one of the two frame interface portions, a thickness of the variable section bench comprises a first reduction when moving toward the internal fore-aft section and a second reduction when moving away from the internal fore-aft section, wherein the first and second reductions are symmetric about the frame interface portion.

In certain embodiments, at a location of at least one of the two frame interface portions, a thickness of the variable section bench comprises a first reduction when moving toward the internal fore-aft section and a second reduction when moving away from the internal fore-aft section, wherein the second reduction comprises a more gradual decrease in thickness compared to the first reduction such that the first and second reductions are asymmetric about the location of at least one of the two frame interface portions.

The upper and lower layers, in certain embodiments, each comprise multiple plies of woven composite material. In some embodiments, the middle layer comprises at least one of woven composite material and composite foam core.

The variable section bench, in certain embodiments, further comprises a reinforcement layer.

In certain embodiments, the reinforcement layer comprises a first portion that extends along the full length of the vehicle seat in the lateral direction and extends approximately 25% from an aft end of the variable section bench toward a forward end of the variable section bench. In some embodiments, the reinforcement layer comprises a second portion that is aligned with the at least one frame interface portion and extends approximately 75% from an aft end of the variable section bench toward a forward end of the variable section bench.

In some embodiments, at the at least one frame interface portion, a frame member is disposed at a bottom surface of the variable section bench and an upper support platform is disposed at a top surface of the variable section bench such that a plurality of fasteners extend from the upper support platform to the frame member through a full thickness of the variable section bench.

According to certain embodiments of the present invention, a passenger seat for a plurality of passengers comprises: at least one frame member; a variable section bench comprising: an upper layer spanning approximately an entire surface area of the variable section bench; a middle layer; a lower layer spanning approximately the entire surface area of the variable section bench; at least one frame interface portion aligned with the at least one frame member, the at least one frame interface portion comprising a fore-aft section; at least one cantilevered portion comprising a fore-aft section; and a seating surface that extends along a full length of the passenger seat in a lateral direction for a plurality of passengers, wherein: the at least one frame interface portion of the variable section bench comprises increased thickness compared to the at least one cantilevered portion.

In certain embodiments, the at least one frame interface portion of the variable section bench is approximately four times as thick as the at least one cantilevered portion.

The at least one frame interface portion, in certain embodiments, comprises two frame interface portions and the variable section bench comprises an internal fore-aft section located approximately halfway between the two frame interface portions.

In some embodiments, at a location of at least one of the two frame interface portions, a thickness of the variable section bench comprises a first reduction when moving toward the internal fore-aft section and a second reduction when moving away from the internal fore-aft section, wherein the first and second reductions are symmetric about the frame interface portion.

In certain embodiments, at a location of at least one of the two frame interface portions, a thickness of the variable section bench comprises a first reduction when moving toward the internal fore-aft section and a second reduction when moving away from the internal fore-aft section, wherein the second reduction comprises a more gradual decrease in thickness compared to the first reduction such that the first and second reductions are asymmetric about the location of at least one of the two frame interface portions.

In some embodiments, the upper and lower layers each comprise multiple plies of woven composite material and the middle layer comprises at least one of woven composite material and composite foam core.

The variable section bench, in certain embodiments, further comprises a reinforcement layer, the reinforcement layer comprising: a first portion that extends along the full length of the passenger seat in the lateral direction and extends approximately 25% from an aft end of the variable section bench toward a forward end of the variable section bench; and a second portion that is aligned with the at least one frame interface portion and extends approximately 75% from an aft end of the variable section bench toward a forward end of the variable section bench.

In some embodiments, at the at least one frame interface portion, a frame member is disposed at a bottom surface of the variable section bench and an upper support platform is disposed at a top surface of the variable section bench such that a plurality of fasteners extend from the upper support platform to the frame member through a full thickness of the variable section bench.

According to certain embodiments of the present invention, a multiple passenger seat assembly comprises: a first frame assembly; a second frame assembly offset from the first frame assembly along a lateral direction along a length of the multiple passenger seat assembly; and a variable section bench attached to an upper portion of the first frame assembly and to an upper portion of the second frame assembly, the variable section bench comprising: an upper layer spanning approximately an entire surface area of the variable section bench; a middle layer; a lower layer spanning approximately the entire surface area of the variable section bench; a first frame interface portion aligned with the first frame assembly; a second frame interface portion aligned with the second frame assembly; a first cantilevered portion at a first end of the variable section bench comprising a fore-aft section; a second cantilevered portion at a second end of the variable section bench comprising a fore-aft section; and a seating surface that extends along a full length of the passenger seat in the lateral direction for a plurality of passengers, wherein: the first frame interface portion and the second frame interface portion of the variable section bench each comprise increased thickness compared to the first cantilevered portion and the second cantilevered portion.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1-8 illustrate embodiments of variable section benches 101 for passenger seats 100 where the variable section bench 101 spans along the full length of the seat 100 in the lateral direction (see FIG. 1) such that the seat 100 may include multiple seat backs 21, 31, 41 and belts 22, 32, 42. The variable section bench 101 includes a seating surface 101.1 common to all seat backs and has a varying contour and thickness such that the variable section bench 101 is structurally optimized to withstand and transfer all seat loads into the frame assemblies of the seat 100 without the need for separate structural members along the length of the seat 100 (see FIG. 1). The seating surface 101.1 may have cushions, layers of foam, or other appropriate objects (not shown) to mimic separation for the portions of the variable section bench 101 for multiple passengers. The drawings focus on seats 100 that are configured for three occupants; however the variable section bench 101 may be adapted for use with seats for any number of occupants, including as few as one or as many as ten or more occupants.

Figure 8:
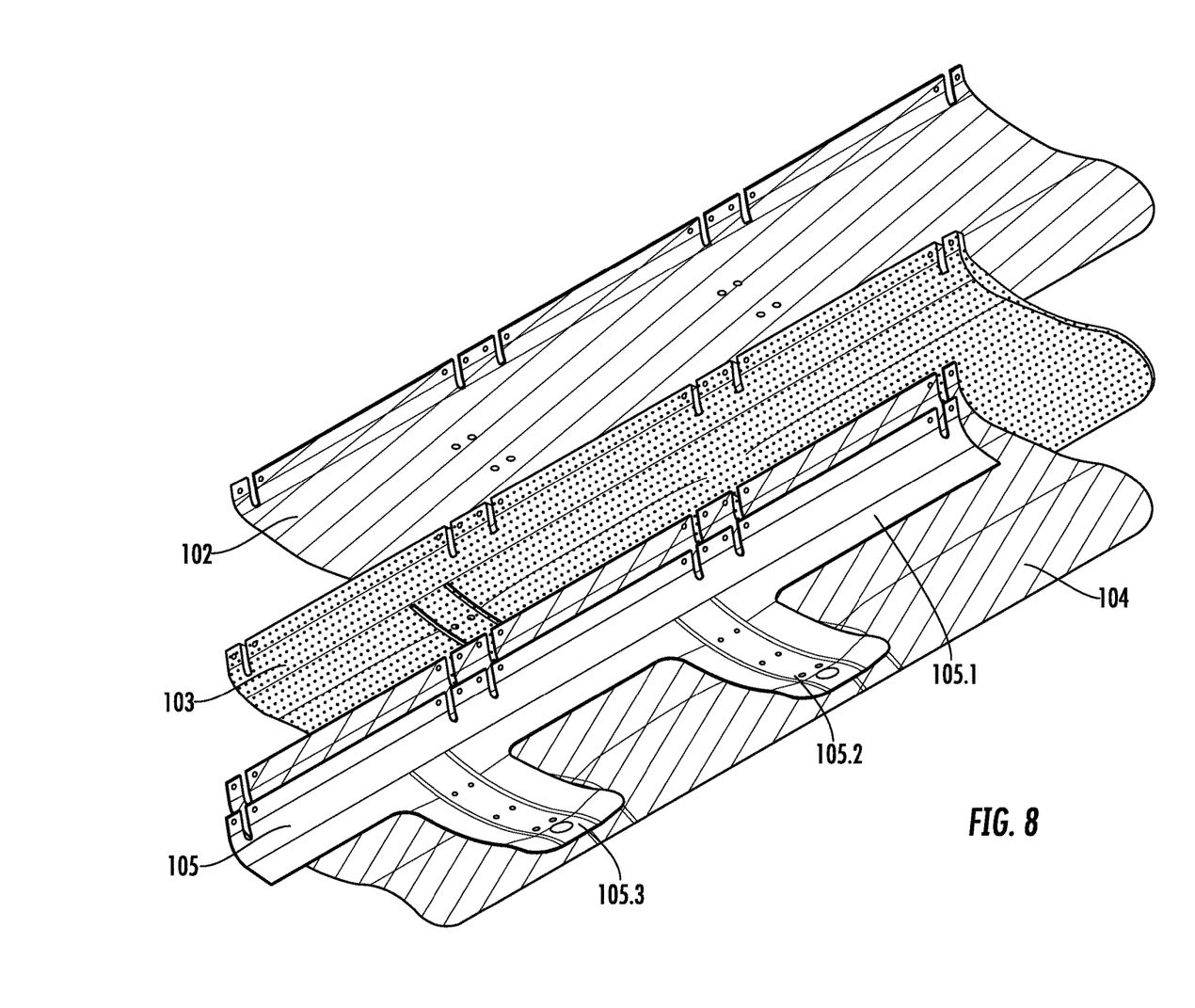
FIG. 8 is an exploded view of the variable section bench of the passenger seat of FIG. 1.
Figure 9A:
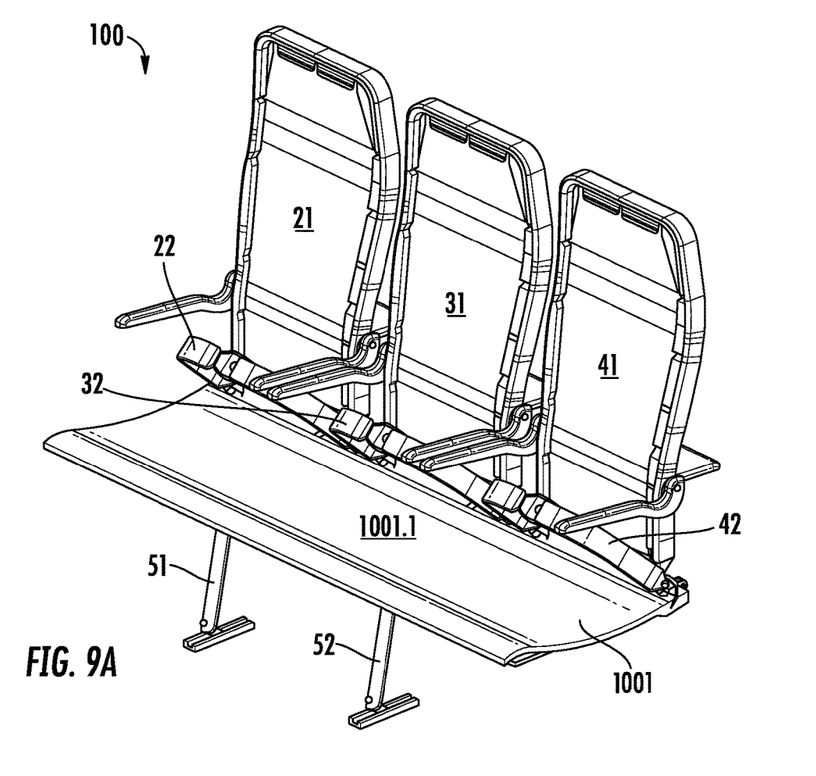
FIG. 9A is a perspective view of a passenger seat according to certain embodiments of the present invention.
Figure 9B:
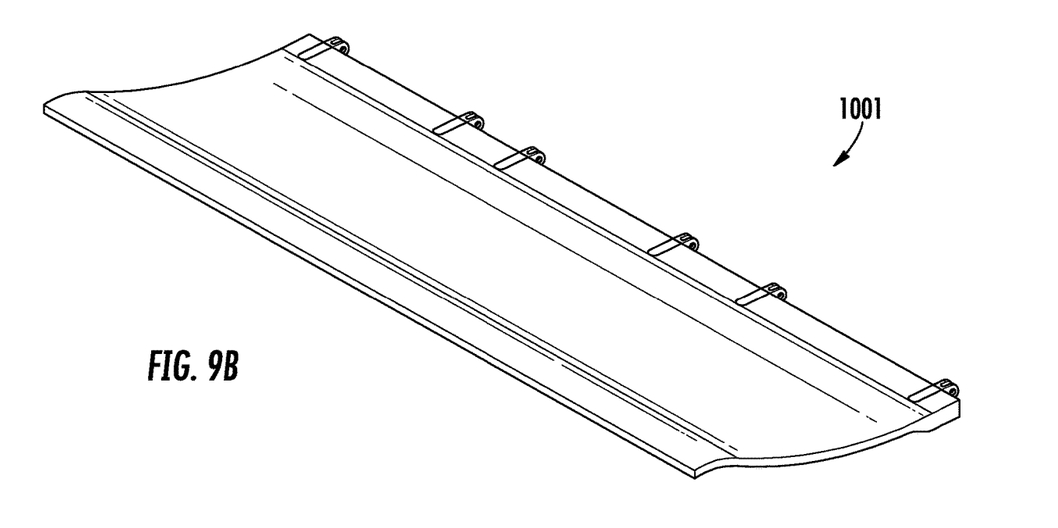
FIG. 9B is a perspective view of the variable section bench of the passenger seat of FIG. 9A.

In these embodiments, the variable section bench 101 may include an upper layer 102, a middle layer 103, and a lower layer 104 (see FIG. 8). In some cases, the variable section bench 101 may include additional layers based on specific structural attachments for the variable section bench 101 and/or loading conditions.

Figure 1:
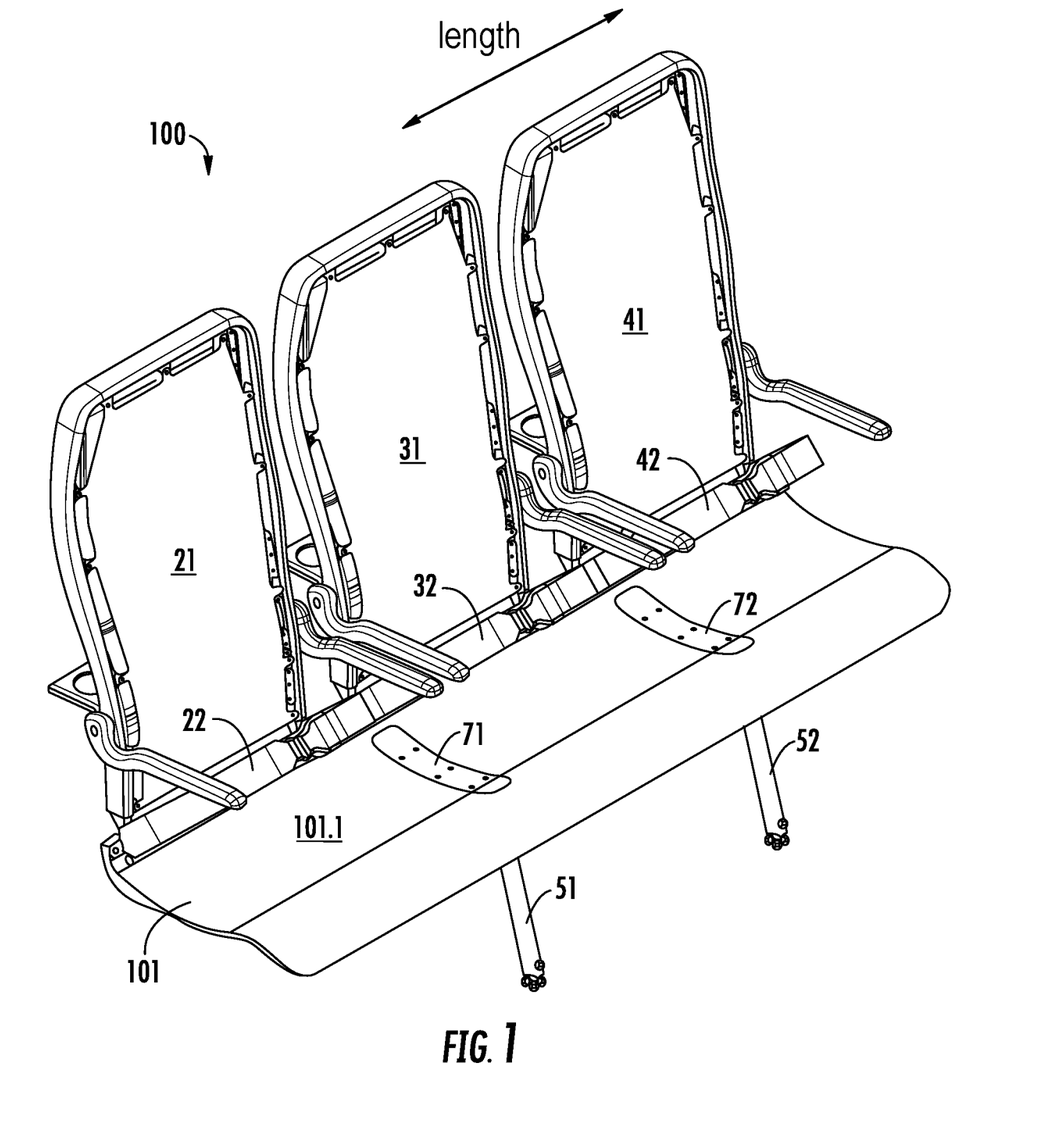
FIG. 1 is a perspective view of a passenger seat according to certain embodiments of the present invention.
Figure 2:
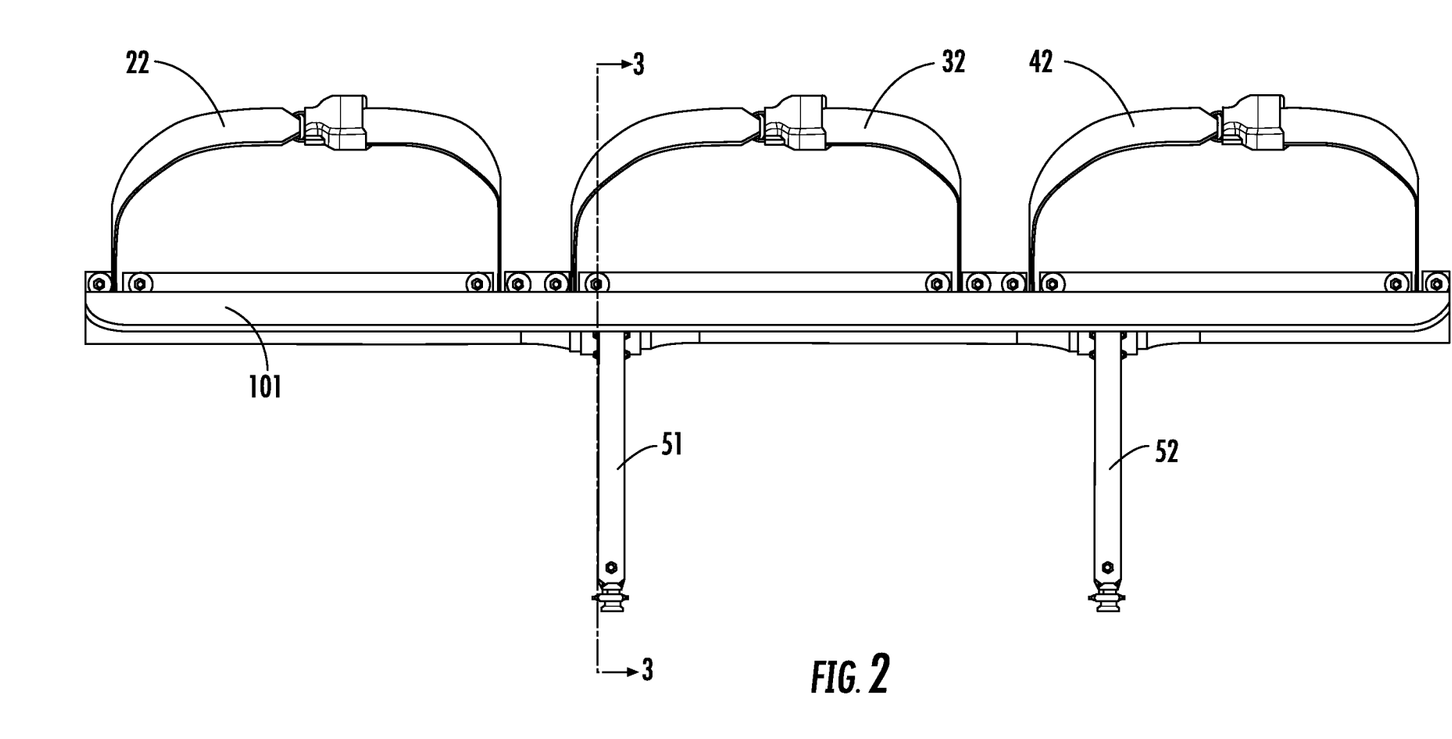
FIG. 2 is a front view of the passenger seat of FIG. 1.
Figure 3:
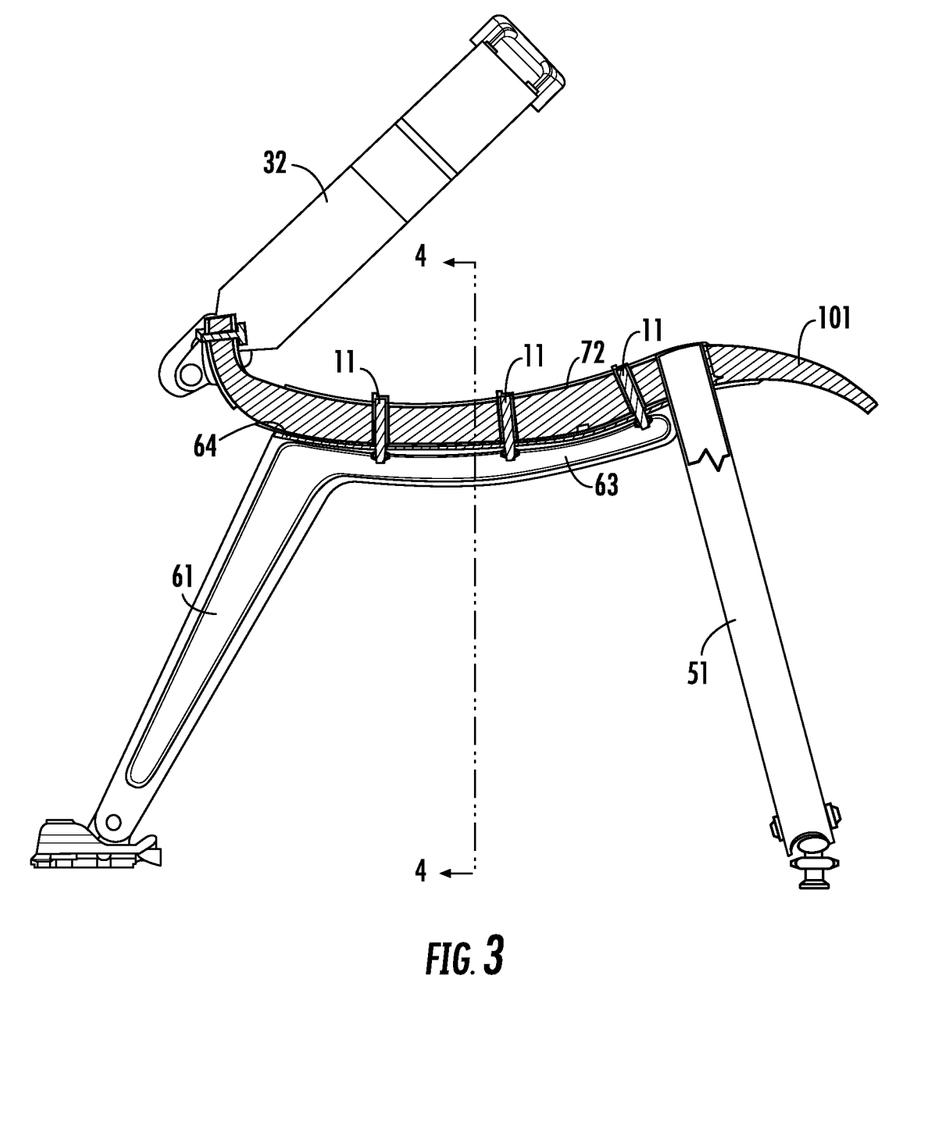
FIG. 3 is a section view of the passenger seat of FIG. 2.

In some embodiments, as shown in FIGS. 1-3, the variable section bench 101 may interface with at least one frame assembly, where each frame assembly may include a forward frame member 51, 52 and an aft frame member 61, 62. The forward frame member 51, 52 may extend through the variable section bench 101 and attach to an upper support platform 71, 72. As shown in FIG. 3, the aft frame member 61 may include an upper portion 63 that includes a contoured surface 64 that corresponds to an appropriate portion of the underside of the variable section bench 101. FIG. 3 shows section 3-3 (see FIG. 2), which is a section view looking in the lateral direction of the seat 100. Fasteners 11 may extend from the upper support platform 71, 72 through the variable section bench 101 into threaded holes in the upper portion 63 of the aft frame member 61, 62. Conventional seats typically require at least one structural member (in addition to the seat pan) extending along the length of the seat with attachment to the various frame assemblies (e.g., attaching to both (1) forward frame member 51/aft frame member 61 and (2) forward frame member 52/aft frame member 62). However, variable section bench 101 (and variable section bench 1001 described below) incorporate structural features and seat pan components into a single component to eliminate additional structural members extending along the length of the seat with attachment to the various frame assemblies.

Figure 4:
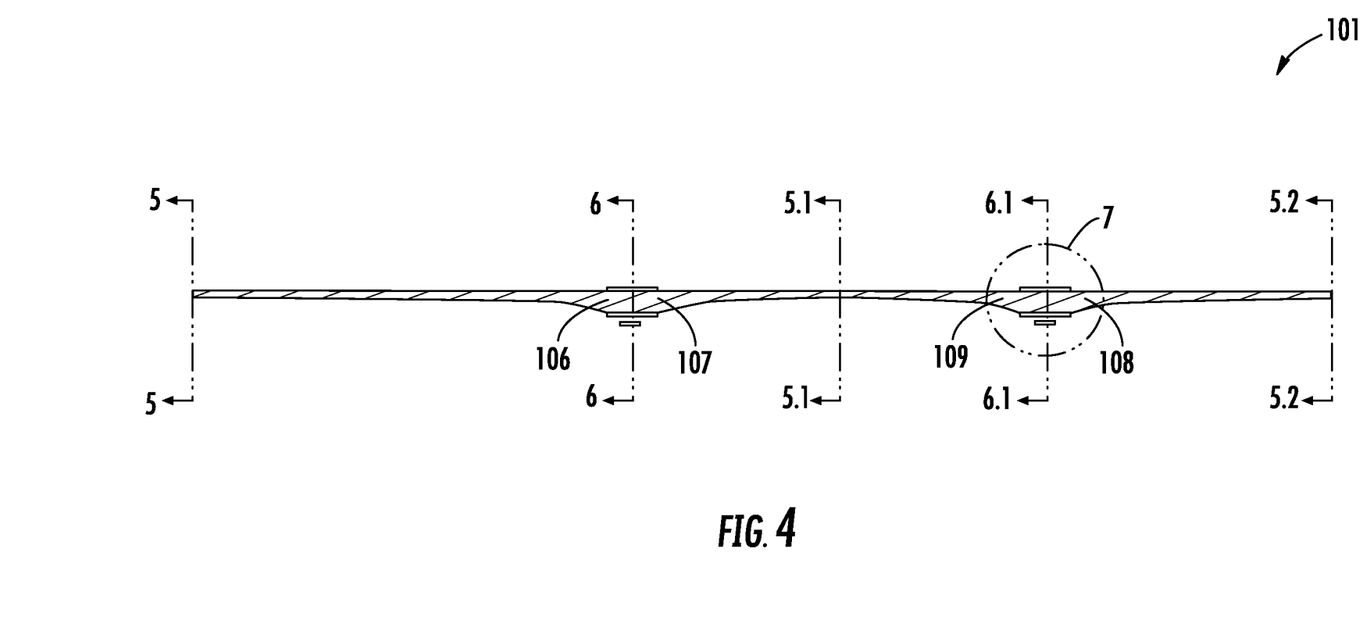
FIG. 4 is a section view of the passenger seat of FIG. 3.
Figure 5:
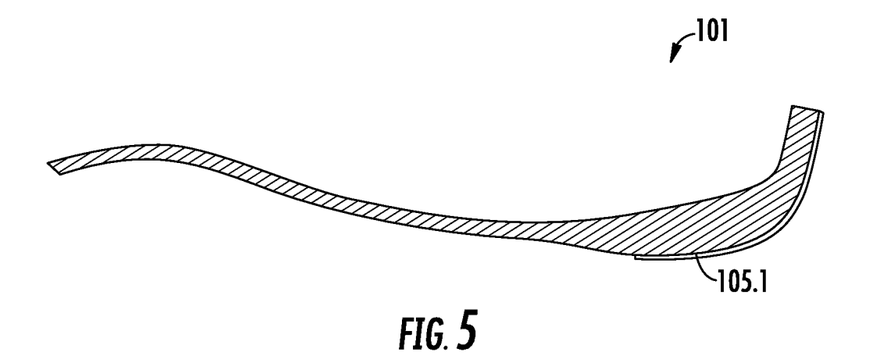
FIGS. 5 and 6 are section views of the passenger seat of FIG. 4.
Figure 6:
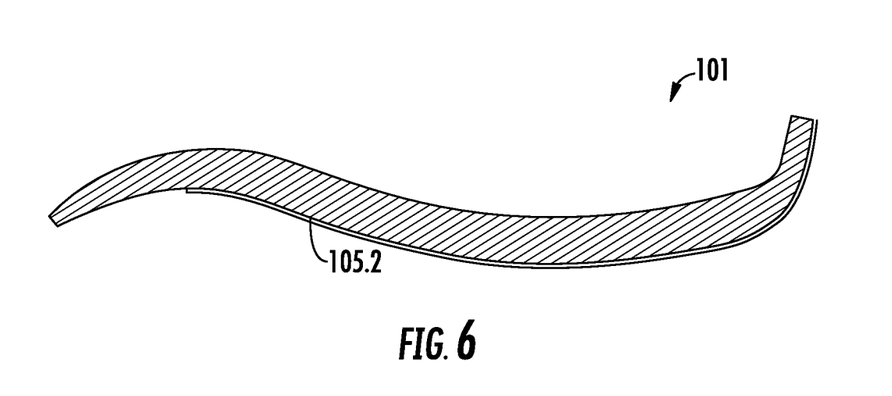

As shown in FIGS. 5 and 6, the variable section bench 101 reduces thickness when moving away from the aft end (where the variable section bench 101 attaches to the seat backs and belts) toward the forward end of the variable section bench 101. In addition to changing thicknesses of the variable section bench 101 when moving from the aft end of the variable section bench 101 to the forward end of the variable section bench 101 (see FIGS. 3, 5, 6), the thickness of the variable section bench 101 may also change along the length as shown in FIG. 4. FIG. 4 is a section view of the entire variable section bench 101 looking aft. For example, the variable section bench 101 may have a fore-aft section 5-5 (see FIGS. 4 and 5) at or near a cantilevered first end and at least one frame interface portion. One example of a frame interface portion is fore-aft section 6-6 (see FIGS. 4 and 6) for interfacing with a first frame assembly (forward frame member 51 and aft frame member 61). The variable section bench 101 may also have an internal section 5.1-5.1 that is approximately halfway between the adjacent frame interface portions, a section 6.1-6.1 for interfacing with a second frame assembly (forward frame member 52 and aft frame member 62), and a section 5.2-5.2 at a cantilevered second end of the seat 100. In some embodiments, as shown in FIG. 4, at least one of section 5.1-5.1 and section 5.2-5.2 may be similar to section 5-5. However, this is not always the case. For example, in some embodiments, internal section 5.1-5.1 (due to its proximity to the frame attachments at section 6-6 and section 6.1-6.1) may require less material to withstand bending loads and to properly distribute loads compared to at least one of section 5-5 and section 5.2-5.2. Furthermore, there may be different requirements for the flexibility of the variable section bench 101 near the ends (section 5-5 and section 5.2-5.2) compared to between the frame attachments (internal section 5.1-5.1). In addition, in certain embodiments, as shown in FIG. 4, section 6.1-6.1 may be similar to section 6-6. However, this is not always the case. For example, in some embodiments, section 6.1-6.1 (due to the shorter cantilevered distance of section 5.2-5.2) may require less material to withstand bending loads and to properly distribute loads compared to section 6-6.

Figure 7:
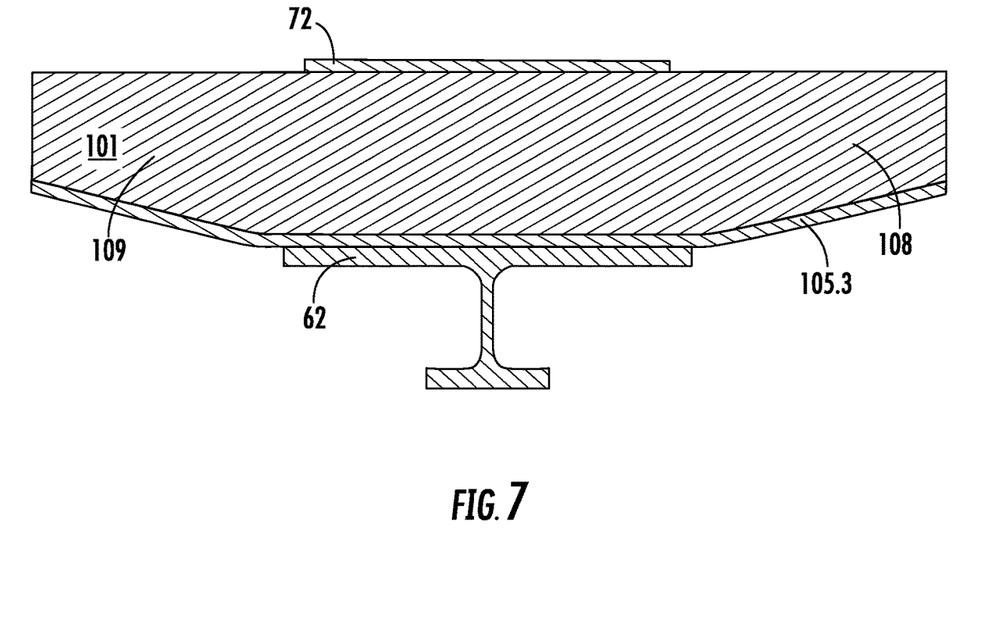
FIG. 7 is a detail view of the section view of the passenger seat of FIG. 4.

Because the seat loads (e.g., loads related to occupants sitting on the variable section bench 101) must transfer from the variable section bench 101 into the structure of the vehicle, the variable section bench 101 is designed to withstand high loads (e.g., shear and bending loads) in the areas near attachment of the frame assemblies. For example, section 6-6 and section 6.1-6.1 may include increased thickness compared to other portions of the variable section bench 101. The increased thickness may be based on local plies of composite material (e.g., woven graphite), metallic features (e.g., machined or sheet metal), composite core material between upper and lower composite face plies, or other relevant features. The increased thickness in these areas may increase the capability of the variable section bench 101 to withstand bearing loads, may facilitate attachment to the frame member(s), may increase the moment of inertia properties (thus affecting bending capability), or may produce any other relevant effect. As shown in FIG. 4, the variable section bench 101 may include a thickness reduction 106 on a first side of the interface with a frame at section 6-6 (i.e., with forward frame member 51 and aft frame member 61) and a thickness reduction 107 on a second side of the interface with a frame at section 6-6. The thickness reduction 106 on the first side of the frame interface may be symmetric relative to the thickness reduction 107 on the second side of the frame interface, although this is not always the case. Similarly, as shown in FIGS. 4 and 7, the variable section bench 101 may include a thickness reduction 108 on a first side of the interface with a frame at section 6.1-6.1 (i.e., with forward frame member 52 and aft frame member 62) and a thickness reduction 109 on a second side of the interface with a frame at section 6.1-6.1. The thickness reduction 108 on the first side of the frame interface may be symmetric relative to the thickness reduction 109 on the second side of the frame interface, although this is not always the case. In some embodiments, the thickness reductions 106-109 each correspond to a series of composite plies that terminate in a stair-step fashion and/or to core that ramps down to a reduced thickness.

As shown in FIG. 5, in some embodiments, the overall thickness of the variable section bench 101 at section 5-5 may reduce quickly to a minimum thickness when moving away from the aft of the seat 100 (i.e., near attachment to the seat backs 21, 31, 41). In some embodiments, the section 5-5 reaches a minimum thickness before reaching a halfway point between the aft end and the forward end of the variable section bench 101. The reinforcement layer 105 (see FIG. 8) may include a first portion 105.1 at section 5-5 that stops near an aft end of the variable section bench 101. In some embodiments, the first portion 105.1 extends along the entire length of the variable section bench 101 in the lateral direction and extends approximately 25% from the aft end of the variable section bench 101 (toward the forward end). FIG. 6 shows one example of a section 6-6 where the section does not reach a minimum thickness until approximately the forward end of the variable section bench 101. A second portion 105.2 of the reinforcement layer 105 (see FIG. 8) may extend a greater distance from the aft end of the variable section bench 101 compared to the first portion 105.1. In some embodiments, the second portion 105.2 extends approximately 75% from the aft end of the variable section bench 101. As shown in FIGS. 7 and 8, the reinforcement layer 105 may include a third portion 105.3 aligned with section 6.1-6.1 that is similar to second portion 105.2.

As shown in FIG. 8, in some embodiments, the variable section bench 101 may include an upper layer 102, a middle layer 103, a lower layer 104, and a reinforcement layer 105. In some examples, at least one of the upper layer 102 and the lower layer 104 have a constant thickness throughout a majority of the entire respective layer. The upper layer 102 and the lower layer 104 may each span the approximately entire surface area of the variable section bench 101. As shown in FIG. 8, the middle layer 103 may also span the approximately entire surface area of the variable section bench 101. The upper layer 102 and/or the lower layer 104 may be a group of one or more woven and/or unidirectional graphite plies or any other suitable material. The middle layer 103 may include at least one woven and/or unidirectional graphite plies, core (e.g., hard foam core, hex-cell core, crush core, etc.), a combination thereof, or any other suitable material. In some embodiments, the variable section bench 101 includes a sandwich panel construction. The middle layer 103 may have variable thickness in at least one direction (e.g., the thickness of the middle layer 103 may change when moving from the aft end of the seat toward the forward end and/or may change when moving along the length of the seat 100). In some embodiments, the variation in thickness between different sections along the length of the variable section bench 101 (e.g., differences between section 5-5 and section 6-6) is primarily due to the differences between the middle layer 103 in the respective areas. Although FIGS. 5-8 illustrate the reinforcement layer 105 as disposed below the lower layer 104, in some embodiments, the reinforcement layer 105 is disposed between the middle layer 103 and the lower layer 104.

FIGS. 9A-12 illustrate embodiments of variable section benches 1001 for passenger seats 100 where the variable section bench 1001 includes a seating surface 1001.1 that extends along the full length of the seat 100 in the lateral direction such that the seat 100 may include multiple seat backs 21, 31, 41 and belts 22, 32, 42. The seating surface 1001.1 is common to all seat backs and may have cushions, layers of foam, or other appropriate objects (not shown) to mimic separation for the portions of the variable section bench 1001 for multiple passengers. The drawings focus on seats 100 that are configured for three occupants; however the variable section bench 1001 may be adapted for use with seats for any number of occupants, including as few as one or as many as ten or more occupants. In these embodiments, the variable section bench 1001 may include an upper layer 1002, a middle layer 1003, and a lower layer 1004 (see FIGS. 10-12). In some cases, the variable section bench 1001 may include additional layers based on specific structural attachments for the variable section bench 1001 and/or loading conditions.

In some embodiments, the variable section bench 1001 may interface with at least one frame assembly (including a forward frame member 51, 52 and an aft frame member 61, 62) similar to the variable section bench 101.

Figure 10:
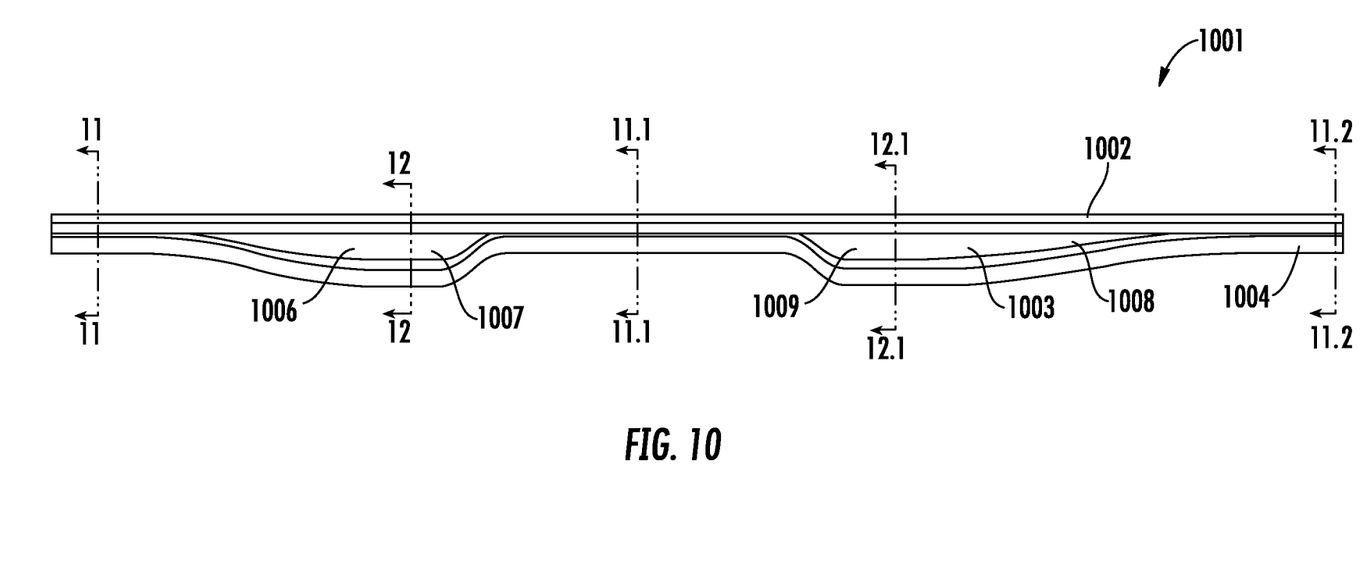
FIG. 10 is a section view of the variable section bench of FIG. 9B.
Figure 11:
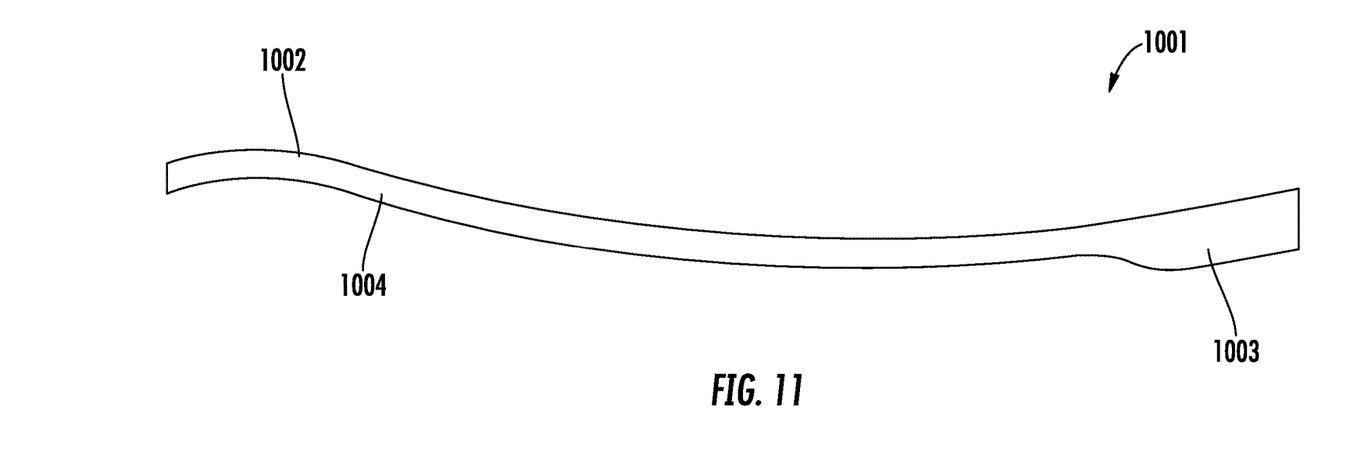
FIGS. 11 and 12 are section views of the variable section bench of FIG. 10.
Figure 12:
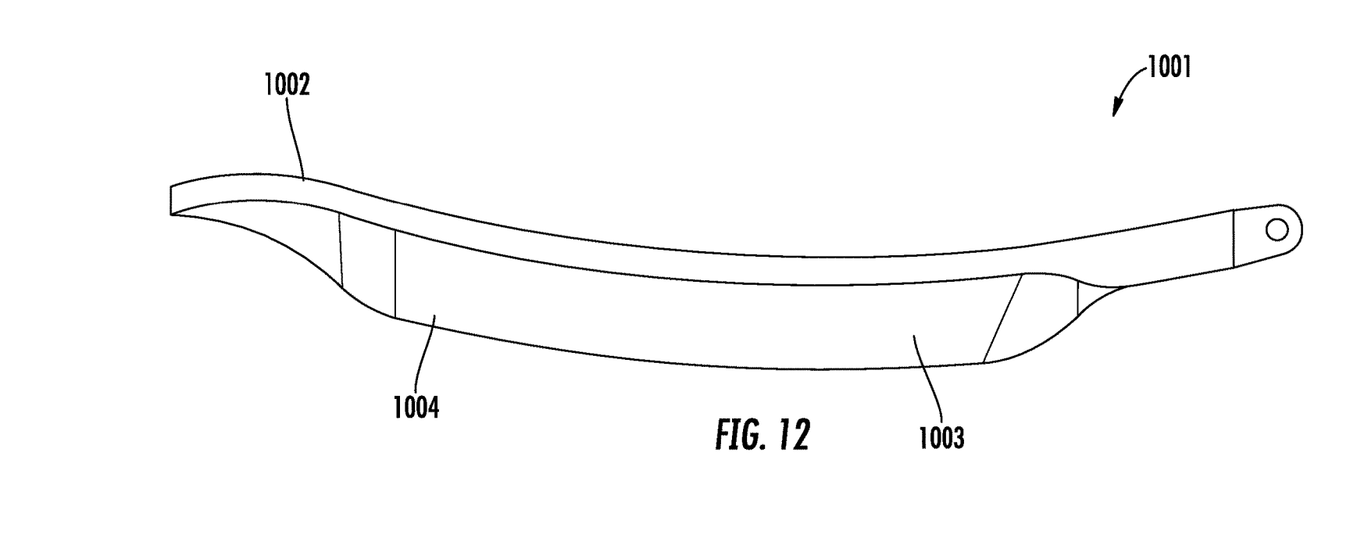

As shown in FIGS. 11 and 12, the variable section bench 1001 reduces thickness at the forward end of the variable section bench 1001 compared to the aft end (where the variable section bench 1001 attaches to the seat backs and belts). In addition to changing thicknesses of the variable section bench 101 when moving from the aft end of the variable section bench 1001 to the forward end of the variable section bench 1001 (see FIGS. 11 and 12), the thickness of the variable section bench 1001 may also change along the length as shown in FIG. 10. FIG. 10 is a section view of the entire variable section bench 1001 looking aft. The variable section bench 1001 may have a fore-aft section 11-11 (see FIGS. 10 and 11) at or near a cantilevered first end and at least one frame interface portion. One example of a frame interface portion is fore-aft section 12-12 (see FIGS. 10 and 12) for interfacing with a first frame assembly (forward frame member 51 and aft frame member 61). The variable section bench 1001 may also have an internal section 11.1-11.1 that is approximately halfway between the adjacent frame interface portions, a section 12.1-12.1 for interfacing with a second frame assembly (forward frame member 52 and aft frame member 62), and a section 11.2-11.2 at a cantilevered second end of the seat 100. In some embodiments, as shown in FIG. 10, at least one of section 11.1-11.1 and section 11.2-11.2 may be similar to section 11-11. However, this is not always the case. For example, in some embodiments, internal section 11.1-11.1 (due to its proximity to the frame attachments at section 12-12 and section 12.1-12.1) may require less material to withstand bending loads and to properly distribute loads compared to at least one of section 11-11 and section 11.2-11.2. Furthermore, there may be different requirements for the flexibility of the variable section bench 1001 near the ends (section 11-11 and section 11.2-11.2) compared to between the frame attachments (internal section 11.1-11.1). In addition, in certain embodiments, as shown in FIG. 10, section 12.1-12.1 may be similar to section 12-12. However, this is not always the case.

Because the seat loads (e.g., loads related to occupants sitting on the variable section bench 1001) must transfer from the variable section bench 1001 into the structure of the vehicle, the variable section bench 1001 is designed to withstand high loads (e.g., shear and bending loads) in the areas near attachment of the frame assemblies. For example, section 12-12 and section 12.1-12.1 may include increased thickness compared to other portions of the variable section bench 1001. The increased thickness may be based on local plies of composite material (e.g., woven graphite), metallic features (e.g., machined or sheet metal), composite core material between upper and lower composite face plies, or other relevant features. The increased thickness in these areas may increase the capability of the variable section bench 1001 to withstand bearing loads, may facilitate attachment to the frame member(s), may increase the moment of inertia properties (thus affecting bending capability), or may produce any other relevant effect. As shown in FIG. 10, the variable section bench 1001 may include a thickness reduction 1006 on a first side of the interface with a frame at section 12-12 (i.e., with forward frame member 51 and aft frame member 61) and a thickness reduction 1007 on a second side of the interface with a frame at section 12-12. As shown in FIG. 10, the thickness reduction 1006 on the first side of the frame interface may extend further from the interface with the frame at section 12-12 (and may reduce in thickness more gradually) than the thickness reduction 1007 on the second side of the frame interface. The additional material of thickness reduction 1006 (compared to thickness reduction 1007) may ensure the variable section bench 1001 can properly distribute loads adjacent to the cantilevered end (near section 11-11) while loads at internal section 11.1-11.1 can be distributed to the frame attachments at both section 12-12 and section 12.1-12.1. Although not illustrated, the thickness reduction 1006 on the first side of the frame interface may be symmetric relative to the thickness reduction 1007 on the second side of the frame interface.

As shown in FIG. 10, the variable section bench 1001 may include a thickness reduction 1008 on a first side of the interface with a frame at section 12.1-12.1 (i.e., with forward frame member 52 and aft frame member 62) and a thickness reduction 1009 on a second side of the interface with a frame at section 12.1-12.1. As shown in FIG. 10, the thickness reduction 1008 on the first side of the frame interface may extend further from the interface with the frame at section 12.1-12.1 (and may reduce in thickness more gradually) than the thickness reduction 1009 on the second side of the frame interface. The additional material of thickness reduction 1008 (compared to thickness reduction 1009) may ensure the variable section bench 1001 can properly distribute loads adjacent to the cantilevered end (near section 11.2-11.2) while loads at internal section 11.1-11.1 can be distributed to the frame attachments at both section 12-12 and section 12.1-12.1. Although not illustrated, the thickness reduction 1008 on the first side of the frame interface may be symmetric relative to the thickness reduction 1009 on the second side of the frame interface. In some embodiments, the thickness reductions 1006-1009 each correspond to a series of composite plies that terminate in a stair-step fashion and/or to core that ramps down to a reduced thickness.

As shown in FIG. 11, in some embodiments, the overall thickness of the variable section bench 1001 at section 11-11 may reduce quickly to a minimum thickness when moving away from the aft of the seat 100 (i.e., near attachment to the seat backs 21, 31, 41). In some embodiments, the section 11-11 reaches a minimum thickness before reaching a halfway point between the aft end and the forward end of the variable section bench 1001. FIG. 12 shows one example of a section 12-12 where the section does not reach a minimum thickness until approximately the forward end of the variable section bench 1001. In some embodiments, the minimum thickness of the variable section bench 1001 at section 11-11 is approximately 0.25 in to 0.75 in (see FIG. 11). In certain embodiments, the minimum thickness of the variable section bench 1001 at section 11-11 is approximately 0.5 in. The thickness of the variable section bench 1001 at the forward end of section 12-12 may be approximately equal to the minimum thickness of the variable section bench 1001 at section 11-11. In some embodiments, the thickness at the aft end of the variable section bench 1001 at section 11-11 is approximately 0.75 in to 1.25 in. In some embodiments, the thickness at the aft end of the variable section bench 1001 at section 11-11 is approximately 1 in. The thickness of the variable section bench 1001 at the aft end of section 12-12 may be approximately equal to the thickness of the variable section bench 1001 at the aft end of section 11-11. In some embodiments, the maximum thickness of the variable section bench 1001 at section 12-12 or section 12.1-12.1 is approximately 1.5 in to 2.5 in (see FIG. 10). In certain embodiments, the maximum thickness of the variable section bench 1001 at section 12-12 or section 12.1-12.1 is approximately 2 in. Accordingly, as shown in a comparison of FIGS. 11 and 12, at a location approximately halfway between the forward end and the aft end, the variable section bench 1001 at section 12-12 is approximately four times the thickness of the variable section bench 1001 at section 11-11 (2 in vs 0.5 in).

As shown in FIGS. 10-12, in some embodiments, the variable section bench 1001 may include an upper layer 1002, a middle layer 1003, and a lower layer 1004. Although not shown, the variable section bench 1001 may include a reinforcement layer (similar to reinforcement layer 105). In some examples, at least one of the upper layer 1002 and the lower layer 1004 have a constant thickness throughout a majority of the entire respective layer. The upper layer 1002 and the lower layer 1004 may each span the approximately entire surface area of the variable section bench 1001. The middle layer 103, in some embodiments, may also span the approximately entire surface area of the variable section bench 1001. The upper layer 1002 and/or the lower layer 1004 may be a group of one or more woven and/or unidirectional graphite plies or any other suitable material. The middle layer 1003 may include at least one woven and/or unidirectional graphite plies, core (e.g., hard foam core, hex-cell core, crush core, etc.), a combination thereof, or any other suitable material. In some embodiments, the variable section bench 1001 includes a sandwich panel construction. The middle layer 1003 may have variable thickness in at least one direction (e.g., the thickness of the middle layer 1003 may change when moving from the aft end of the seat toward the forward end and/or may change when moving along the length of the seat 100). In some embodiments, the variation in thickness between different sections along the length of the variable section bench 1001 (e.g., differences between section 11-11 and section 12-12) is primarily due to the differences between the middle layer 1003 in the respective areas.

The components of the seat 100 may be formed of materials including, but not limited to, aluminum, steel, titanium, carbon composite, graphite composite, polyester, nylon, plastic, thermoplastic, other fabric materials, stainless steel, other plastic or polymer materials, other metallic materials, other composite materials, or other similar materials. Moreover, the components of the seat 100 may be attached to one another via suitable fasteners, which include, but are not limited to, screws, bolts, rivets or other mechanical or chemical fasteners.

In the following, further examples are described to facilitate understanding of aspects of the invention:

Example A

A variable section bench for a vehicle seat, the variable section bench comprising:
an upper layer, a middle layer, and a lower layer;
at least one frame interface portion comprising a fore-aft section;
at least one cantilevered portion comprising a fore-aft section; and
a seating surface that extends along a full length of the vehicle seat in a lateral direction for a plurality of passengers, wherein:
the at least one frame interface portion of the variable section bench comprises increased thickness compared to the at least one cantilevered portion.

Example B

The variable section bench of Example A or any of the preceding or subsequent examples, wherein the at least one frame interface portion of the variable section bench is approximately four times as thick as the at least one cantilevered portion.

Example C

The variable section bench of Example A or any of the preceding or subsequent examples, wherein the at least one frame interface portion comprises two frame interface portions and the variable section bench comprises an internal fore-aft section located approximately halfway between the two frame interface portions.

Example D

The variable section bench of Example C or any of the preceding or subsequent examples, wherein, at a location of at least one of the two frame interface portions, a thickness of the variable section bench comprises a first reduction when moving toward the internal fore-aft section and a second reduction when moving away from the internal fore-aft section, wherein the first and second reductions are symmetric about the frame interface portion.

Example E

The variable section bench of Example C or any of the preceding or subsequent examples, wherein, at a location of at least one of the two frame interface portions, a thickness of the variable section bench comprises a first reduction when moving toward the internal fore-aft section and a second reduction when moving away from the internal fore-aft section, wherein the second reduction comprises a more gradual decrease in thickness compared to the first reduction such that the first and second reductions are asymmetric about the location of at least one of the two frame interface portions.

Example F

The variable section bench of Example A or any of the preceding or subsequent examples, wherein the upper and lower layers each comprise multiple plies of woven composite material.

Example G

The variable section bench of Example A or any of the preceding or subsequent examples, wherein the middle layer comprises at least one of woven composite material and composite foam core.

Example H

The variable section bench of Example A or any of the preceding or subsequent examples, further comprising a reinforcement layer.

Example I

The variable section bench of Example H or any of the preceding or subsequent examples, wherein the reinforcement layer comprises a first portion that extends along the full length of the vehicle seat in the lateral direction and extends approximately 25% from an aft end of the variable section bench toward a forward end of the variable section bench.

Example J

The variable section bench of Example H or any of the preceding or subsequent examples, wherein the reinforcement layer comprises a second portion that is aligned with the at least one frame interface portion and extends approximately 75% from an aft end of the variable section bench toward a forward end of the variable section bench.

Example K

The variable section bench of Example A or any of the preceding or subsequent examples, wherein, at the at least one frame interface portion, a frame member is disposed at a bottom surface of the variable section bench and an upper support platform is disposed at a top surface of the variable section bench such that a plurality of fasteners extend from the upper support platform to the frame member through a full thickness of the variable section bench.

Example L

A passenger seat for a plurality of passengers, the passenger seat comprising:
  at least one frame member;
  a variable section bench comprising:
    an upper layer spanning approximately an entire surface area of the variable section bench;
    a middle layer;
    a lower layer spanning approximately the entire surface area of the variable section bench;
    at least one frame interface portion aligned with the at least one frame member, the at least one frame interface portion comprising a fore-aft section;
    at least one cantilevered portion comprising a fore-aft section; and
    a seating surface that extends along a full length of the passenger seat in a lateral direction for a plurality of passengers, wherein:
      the at least one frame interface portion of the variable section bench comprises increased thickness compared to the at least one cantilevered portion.

Example M

The variable section bench of Example L or any of the preceding or subsequent examples, wherein the at least one frame interface portion of the variable section bench is approximately four times as thick as the at least one cantilevered portion.

Example N

The variable section bench of Example L or any of the preceding or subsequent examples, wherein the at least one frame interface portion comprises two frame interface portions and the variable section bench comprises an internal fore-aft section located approximately halfway between the two frame interface portions.

Example O

The variable section bench of Example N or any of the preceding or subsequent examples, wherein, at a location of at least one of the two frame interface portions, a thickness of the variable section bench comprises a first reduction when moving toward the internal fore-aft section and a second reduction when moving away from the internal fore-aft section, wherein the first and second reductions are symmetric about the frame interface portion.

Example P

The variable section bench of Example N or any of the preceding or subsequent examples, wherein, at a location of at least one of the two frame interface portions, a thickness of the variable section bench comprises a first reduction when moving toward the internal fore-aft section and a second reduction when moving away from the internal fore-aft section, wherein the second reduction comprises a more gradual decrease in thickness compared to the first reduction such that the first and second reductions are asymmetric about the location of at least one of the two frame interface portions.

Example Q

The variable section bench of Example L or any of the preceding or subsequent examples, wherein the upper and lower layers each comprise multiple plies of woven composite material and the middle layer comprises at least one of woven composite material and composite foam core.

Example R

The variable section bench of Example L or any of the preceding or subsequent examples, further comprising a reinforcement layer, the reinforcement layer comprising:
 a first portion that extends along the full length of the passenger seat in the lateral direction and extends approximately 25% from an aft end of the variable section bench toward a forward end of the variable section bench; and
 a second portion that is aligned with the at least one frame interface portion and extends approximately 75% from an aft end of the variable section bench toward a forward end of the variable section bench.

Example S

The variable section bench of Example L or any of the preceding or subsequent examples, wherein, at the at least one frame interface portion, a frame member is disposed at a bottom surface of the variable section bench and an upper support platform is disposed at a top surface of the variable section bench such that a plurality of fasteners extend from the upper support platform to the frame member through a full thickness of the variable section bench.

Example T

A multiple passenger seat assembly comprising:
 a first frame assembly;
 a second frame assembly offset from the first frame assembly along a lateral direction along a length of the multiple passenger seat assembly; and
 a variable section bench attached to an upper portion of the first frame assembly and to an upper portion of the second frame assembly, the variable section bench comprising:
  an upper layer spanning approximately an entire surface area of the variable section bench;
  a middle layer;
  a lower layer spanning approximately the entire surface area of the variable section bench;
  a first frame interface portion aligned with the first frame assembly;
  a second frame interface portion aligned with the second frame assembly;
  a first cantilevered portion at a first end of the variable section bench comprising a fore-aft section;
  a second cantilevered portion at a second end of the variable section bench comprising a fore-aft section; and
  a seating surface that extends along a full length of the passenger seat in the lateral direction for a plurality of passengers, wherein:
   the first frame interface portion and the second frame interface portion of the variable section bench each comprise increased thickness compared to the first cantilevered portion and the second cantilevered portion.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A bench for a vehicle seat, the bench comprising:
 an upper layer, a middle layer, and a lower layer;
 two frame interface portions, each frame interface portion located where the bench is attachable to a frame assembly of the vehicle seat, each frame interface portion comprising a fore-aft section;
 an internal fore-aft section positioned half-way between a first side of each of the two frame interface portions; and
 at least one cantilevered portion comprising a fore-aft section, wherein the at least one cantilevered portion is positioned adjacent to a second side of at least one of the two frame interface portions;
 a first reduction attached to and extending between the first side of the at least one of the two frame interface portions and the internal fore-aft section, wherein the first reduction continuously reduces in thickness as it extends from the first side to the internal fore-aft section;
 a second reduction extending between the second side of the at least one of the two frame interface portions and the least one cantilevered portion, wherein the second reduction reduces in thickness as it extends from the second side to the least one cantilevered portion; and
 wherein the two frame interface portions each comprise an increased thickness as compared to the at least one cantilevered portion and the internal fore-aft section.

2. The bench of claim 1, wherein the at least one frame interface portion of the bench is four times as thick as the at least one cantilevered portion.

3. The bench of claim 1, wherein the first and second reductions are symmetric about the location of at least one of the two frame interface portions.

4. The bench of claim 1, wherein the second reduction comprises a more gradual decrease in thickness as compared to the first reduction such that the first and second reductions are asymmetric about a location of at least one of the two frame interface portions.

5. The bench of claim 1, wherein the upper and lower layers each comprise multiple plies of woven composite material.

6. The bench of claim 1, wherein the middle layer comprises at least one of woven composite material and composite foam core.

7. The bench of claim 1, further comprising a reinforcement layer.

8. The bench of claim 7, wherein the reinforcement layer comprises a first portion that extends along the full length of the vehicle seat in the lateral direction and extends 25% from an aft end of the bench toward a forward end of the bench.

9. The bench of claim 7, wherein the reinforcement layer comprises a second portion that is aligned with the at least one frame interface portion and extends 75% from an aft end of the bench toward a forward end of the bench.

10. The bench of claim 1, wherein the frame assembly comprises a frame member;
wherein, at a location of the at least one of the two frame interface portions, the frame member is disposed at a bottom surface of the bench and an upper support platform is disposed at a top surface of the bench such that a plurality of fasteners extend from the upper support platform to the frame member through a full thickness of the bench.

11. A passenger seat comprising:
a bench comprising:
an upper layer,
a middle layer, and
a lower layer;
two frame interface portions, each frame interface portion located where the bench is attachable to a frame assembly of the passenger seat, each frame interface portion comprising a fore-aft section;
an internal fore-aft section positioned halfway between a first side of each of the two frame interface portions; and
at least one cantilevered portion comprising a fore-aft section, wherein the at least one cantilevered portion is positioned adjacent to a second side of at least one of the two frame interface portions;
a first reduction attached to and extending between the first side of the at least one of the two frame interface portions and the internal fore-aft section, wherein the first reduction continuously reduces in thickness as it extends from the first side to the internal fore-aft section;
a second reduction extending between the second side of the at least one of the two frame interface portions and the least one cantilevered portion, wherein the second reduction reduces in thickness as it extends from the second side to the least one cantilevered portion;
wherein the two frame interface portions each comprise an increased thickness as compared to the at least one cantilevered portion and the internal fore-aft section.

12. The bench of claim 11, wherein the at least one frame interface portion of the bench is four times as thick as the at least one cantilevered portion.

13. The bench of claim 11, wherein the first and second reductions are symmetric about the location of at least one of the two frame interface portions.

14. The bench of claim 11, wherein the second reduction comprises a more gradual decrease in thickness compared to the first reduction such that the first and second reductions are asymmetric about a location of at least one of the two frame interface portions.

15. The bench of claim 11, wherein the upper and lower layers each comprise multiple plies of woven composite material and the middle layer comprises at least one of woven composite material and composite foam core.

16. The bench of claim 11, further comprising a reinforcement layer, the reinforcement layer comprising:
a first portion that extends along the full length of the passenger seat in the lateral direction and extends 25% from an aft end of the bench toward a forward end of the; and
a second portion that is aligned with the at least one frame interface portion and extends 75% from an aft end of the bench toward a forward end of the bench.

17. The bench of claim 11, the frame assembly is disposed at a bottom surface of the bench and an upper support platform is disposed at a top surface of the bench such that a plurality of fasteners extend from the upper support platform to the at least one frame member through a full thickness of the bench.

18. A bench for a passenger seat comprising:
an upper layer, a middle layer, and a lower layer;
two frame interface portions, each frame interface portion located where the bench is attachable to a frame assembly of the passenger seat, each frame interface portion comprising a fore-aft section;
an internal fore-aft section positioned half-way between a first side of each of the two frame interface portions; and
at least one cantilevered portion comprising a fore-aft section, wherein the at least one cantilevered portion is positioned adjacent to a second side of at least one of the two frame interface portions;
a first reduction attached to and extending between the first side of the at least one of the two frame interface portions and the internal fore-aft section, wherein the first reduction continuously reduces in thickness as it extends from the first side to the internal fore-aft section;
a second reduction extending between the second side of the at least one of the two frame interface portions and the least one cantilevered portion, wherein the second reduction reduces in thickness as it extends from the second side to the least one cantilevered portion; and
wherein the two frame interface portions each comprise an increased thickness as compared to the at least one cantilevered portion and the internal fore-aft section; and
wherein the bench extends along a full length of the passenger seat in a lateral direction when joined to the passenger seat and is configured to seat a plurality of passengers located adjacent to each other on a seating surface when the plurality of passengers are seated on the passenger seat.

* * * * *